(12) United States Patent
Shimma

(10) Patent No.: US 10,432,848 B2
(45) Date of Patent: Oct. 1, 2019

(54) ELECTRONIC APPARATUS AND METHOD FOR CONTROLLING THE SAME

(71) Applicant: CANON KABUSHIKI KAISHA, Tokyo (JP)

(72) Inventor: Naoki Shimma, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 71 days.

(21) Appl. No.: 15/903,699

(22) Filed: Feb. 23, 2018

(65) Prior Publication Data
US 2018/0249068 A1    Aug. 30, 2018

(30) Foreign Application Priority Data
Feb. 28, 2017   (JP) .................. 2017-037716

(51) Int. Cl.
| H04N 5/232 | (2006.01) |
| H04N 5/222 | (2006.01) |
| H04N 5/225 | (2006.01) |
| G06F 3/00 | (2006.01) |
| H04N 1/00 | (2006.01) |

(52) U.S. Cl.
CPC ......... *H04N 5/23216* (2013.01); *G06F 3/005* (2013.01); *H04N 1/00408* (2013.01); *H04N 1/00472* (2013.01); *H04N 5/222* (2013.01); *H04N 5/225* (2013.01); *H04N 5/23293* (2013.01)

(58) Field of Classification Search
CPC ........... H04N 5/23216; H04N 5/23293; H04N 5/222; H04N 5/225; H04N 1/00408; H04N 1/00472; G06F 3/005
See application file for complete search history.

(56) References Cited

U.S. PATENT DOCUMENTS

| 2006/0229116 A1* | 10/2006 | Ishihara ............... G06F 1/1616 455/575.3 |
| 2007/0123205 A1* | 5/2007 | Lee ...................... G06F 1/1616 455/403 |
| 2008/0240694 A1* | 10/2008 | Okazaki ................ G03B 17/18 396/50 |

(Continued)

FOREIGN PATENT DOCUMENTS

| JP | 2015-177420 A | 10/2015 |
| JP | 2016-62116 A | 4/2016 |

*Primary Examiner* — Abdelaaziz Tissire
(74) *Attorney, Agent, or Firm* — Canon U.S.A., Inc. IP Division

(57) ABSTRACT

An electronic apparatus includes a display unit arranged on a first surface, a first operation member arranged on a second surface, a second operation member arranged on a third surface, and a memory and at least one processor or circuit. The third surface is on a right side of the electronic apparatus when the first and second surfaces are viewed as front and top sides, respectively, of the electronic apparatus. The memory and the at least one processor or circuit function as a control unit configured to perform control to change a setting value to be selected from among a plurality of candidate setting values displayed on the display unit to a smaller setting value according to an operation on the first operation member and change the setting value to be selected to a larger setting value according to an operation on the second operation member.

27 Claims, 9 Drawing Sheets

(56) References Cited

U.S. PATENT DOCUMENTS

| | | | |
|---|---|---|---|
| 2009/0061295 A1* | 3/2009 | Matsumoto | H01M 2/1066 |
| | | | 429/99 |
| 2010/0134433 A1* | 6/2010 | Miyanishi | G03B 19/00 |
| | | | 345/173 |
| 2015/0138387 A1* | 5/2015 | Kokubu | G06F 3/04886 |
| | | | 348/222.1 |
| 2015/0180527 A1* | 6/2015 | Fathollahi | H04B 1/3888 |
| | | | 455/575.8 |
| 2018/0302560 A1* | 10/2018 | Arai | H04N 5/23293 |

* cited by examiner

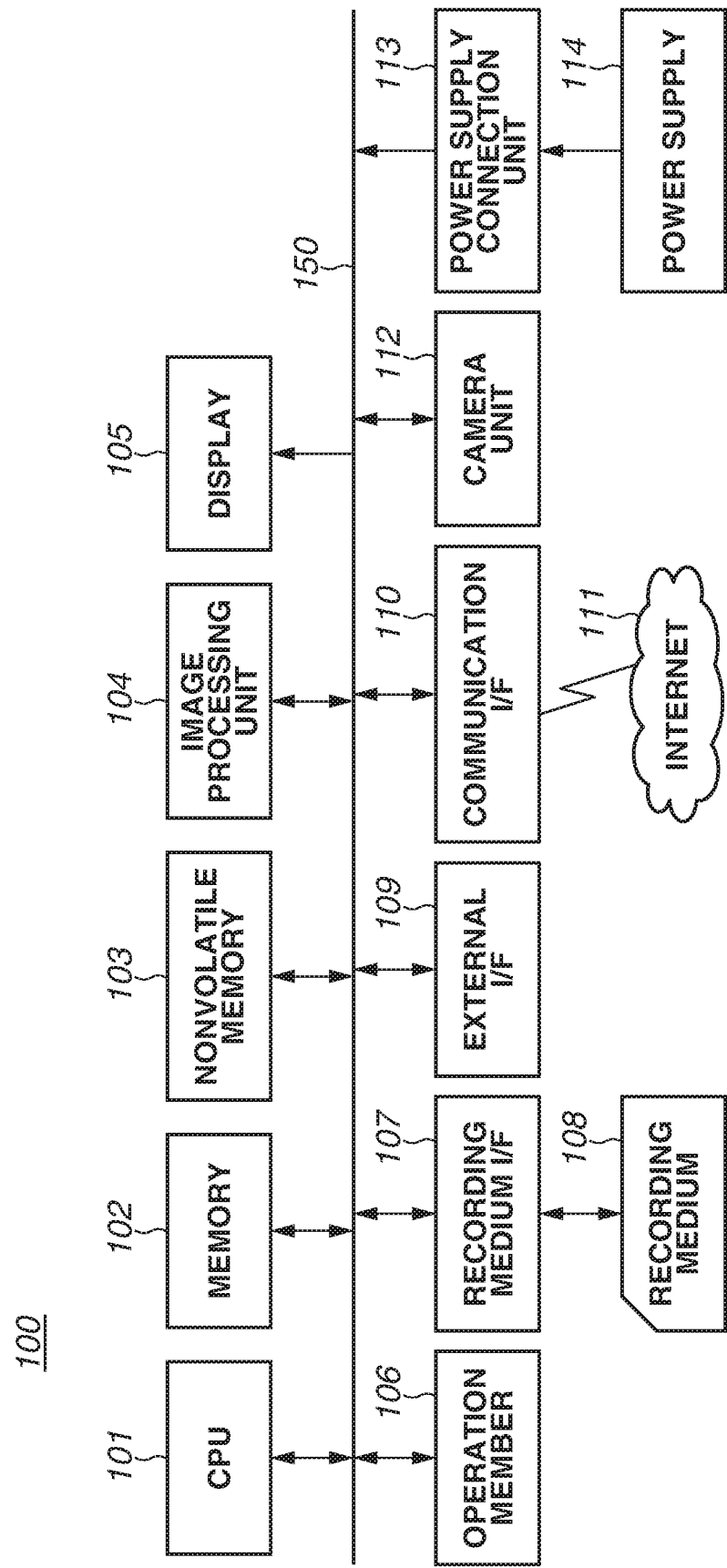

ELECTRONIC APPARATUS AND METHOD FOR CONTROLLING THE SAME

BACKGROUND OF THE INVENTION

Field of the Invention

One disclosed aspect of the embodiments relates to an electronic apparatus and a method for controlling the same. In particular, an embodiment relates to a technique for controlling operations using a plurality of operation members arranged on different surfaces.

Description of the Related Art

Conventional electronic apparatuses are commonly operated by using a direction instruction member such as a directional pad. Japanese Patent Application Laid-Open No. 2016-62116 discusses an electronic apparatus which includes a directional pad including up, down, left, and right buttons. The up and down buttons are used to vertically move a focus on a menu screen. The left and right buttons are used to horizontally move the focus on the menu screen.

As integration techniques of electronic circuits and miniaturization techniques of electronic components improve, apparatus main bodies are ever becoming thinner and smaller in size. Demand for miniaturization is on the increase, such as for installation on a drone (small-sized unmanned aircraft) and for use as a wearable device which is an electronic apparatus worn in use. Digital cameras, a type of electronic apparatus, are finding more uses as action cameras which can be installed and used on a helmet, a bicycle or motorcycle handle, or the tip of a surfboard or snowboard. Miniaturization is desired even in such uses. Japanese Patent Application Laid-Open No. 2015-177420 discusses a small-sized lightweight ear-hook wearable camera which includes a power switch, a release button for giving instructions to start and stop imaging, a zoom lever, a lens, and an ear hook portion.

As devices become smaller, the space available for arranging operation members also becomes smaller. Operation members similar to conventional ones are becoming difficult to be included to provide a feeling of operation similar to heretofore. For example, the ear-hook wearable camera discussed in Japanese Patent Application Laid-Open No. 2015-177420 includes no operation member for giving instructions about vertical and horizontal directions. It is thus difficult to provide the users with a feeling of operation similar to that of direction instruction operations using the directional pad discussed in Japanese Patent Application Laid-Open No. 2016-62116. Since the space available for arranging operation members decreases due to device miniaturization, a plurality of operation members may sometimes need to be arranged on different surfaces of an electronic apparatus. No consideration has heretofore been given to what operation method can be provided to improve the user's operability in such a case.

SUMMARY OF THE INVENTION

One disclosed aspect of the embodiments is directed to an electronic apparatus, a method for controlling the same, and a storage medium which allow the user to make intuitive operations even when operation members provided on different surfaces of the electronic apparatus are used.

According to an aspect of the embodiments, an electronic apparatus includes a display unit, a first operation member, a second operation member, and a memory and at least one processor or circuit. The display unit is arranged on a first surface of the electronic apparatus. The first operation member is arranged on a second surface of the electronic apparatus. The second operation member is arranged on a third surface of the electronic apparatus. The memory and the at least one processor or circuit function as a control unit configured to perform control to change an item to be selected from among a plurality of items displayed on the display unit to a previous item according to an operation on the first operation member and change the item to be selected to a next item according to an operation on the second operation member.

Further features of the disclosure will become apparent from the following description of exemplary embodiments with reference to the attached drawings.

BRIEF DESCRIPTION OF THE DRAWINGS

FIG. 1 is a block diagram illustrating a configuration of a digital camera.

DESCRIPTION OF THE EMBODIMENTS

Figure 2A:
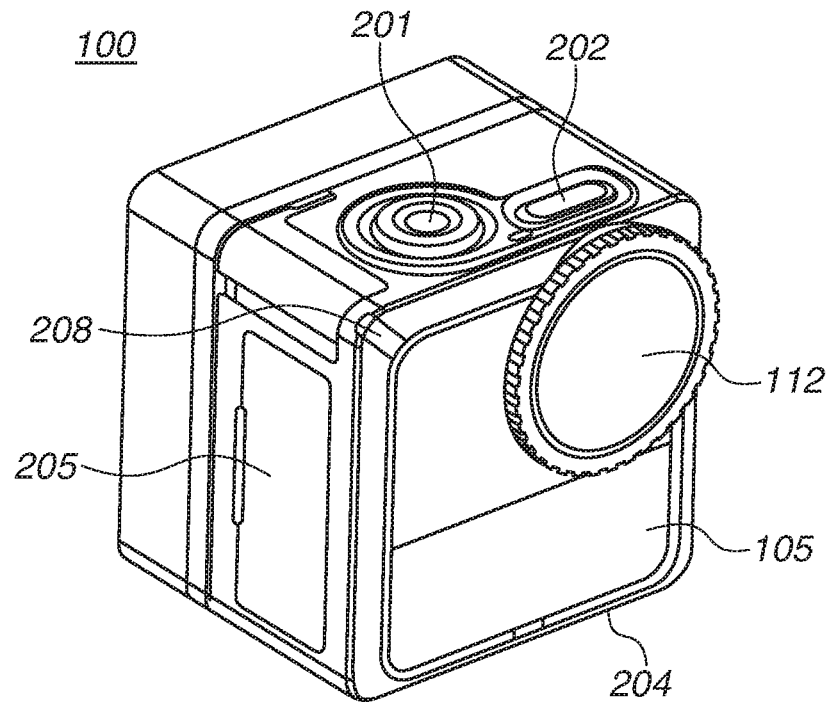
FIGS. 2A and 2B are diagrams illustrating external views of the digital camera.

An exemplary embodiment will be described in detail below with reference to the accompanying drawings.

It is to be noted that the following exemplary embodiment is merely one example for implementing the disclosure and can be appropriately modified or changed depending on individual constructions and various conditions of apparatuses to which the disclosure is applied. Thus, the disclosure is in no way limited to the following exemplary embodiment.

FIG. 1 is a block diagram illustrating an example of a configuration of a digital camera 100 which is an example of an electronic apparatus to which the present exemplary embodiment can be applied.

A central processing unit (CPU) 101, a memory 102, a nonvolatile memory 103, an image processing unit 104, a display 105, an operation member 106, a recording medium interface (I/F) 107, an external I/F 109, a communication I/F 110, a camera unit 112, and a power supply connection unit 113 are connected to an internal bus 150. The units connected to the internal bus 150 can exchange data with each other via the internal bus 150.

The CPU 101 is a processor that controls various parts of the digital camera 100, for example, according to a program or instructions stored in the nonvolatile memory 103 and by using the memory 102 as a working memory. For example, the memory 102 may be a random access memory (RAM) (volatile memory using semiconductor elements). The nonvolatile memory 103 stores image data, audio data, other data, and various programs or instructions by which the CPU 101 operates or executes to perform operations described in the following. For example, the nonvolatile memory 103 includes a hard disk (HD), a read-only memory (ROM), or a flash memory.

The image processing unit 104 performs various types of image processing on image data stored in the nonvolatile memory 103 and the recording medium 108, a video signal obtained via the external I/F 109, and image data obtained via the communication I/F 110, based on control of the CPU 101. The image processing to be performed by the image processing unit 104 includes analog-to-digital (A/D) conversion processing, digital-to-analog (D/A) conversion processing, encoding processing of image data, compression processing, decoding processing, enlargement/reduction processing (resizing), noise reduction processing, and color conversion processing. The image processing unit 104 may be a dedicated circuit block for performing specific image processing. Depending on the type of image processing, the CPU 101 may perform the image processing according to a program, without the use of the image processing unit 104.

The display 105 displays images and a graphical user interface (GUI) screen that constitutes a GUI, based on control of the CPU 101. The CPU 101 generates a display control signal according to a program, and controls various units of the digital camera 100 to generate and output a video signal to be displayed on the display 105 to the display 105. The display 105 displays a video image based on the output video signal.

The operation members 106 may include an input device for accepting user operations. The operation members 106 (operation unit 106) may include a button, a dial, and/or a joystick.

The recording medium I/F 107 is configured so that a recording medium 108, such as a memory card, a compact disc (CD), and a digital versatile disc (DVD), can be mounted thereon. The recording medium I/F 107 reads data from the mounted recording medium 108 and writes data to the recording medium 108 based on control of the CPU 101. The external I/F 109 is an interface for connecting to an external apparatus via a cable or wirelessly, and inputting and outputting video and audio signals. The communication I/F 110 is an interface for communicating with an external apparatus or the Internet 111 to transmit and receive various types of data such as a file and a command.

The camera unit 112 includes a lens group including a zoom lens and a focus lens, and an image sensor for converting an optical image into an electrical signal. The image sensor includes a charge-coupled device (CCD) sensor or a complementary metal-oxide-semiconductor (CMOS) sensor. The camera unit 112 can generate object image data.

The power supply connection unit 113 receives power from a power supply 114, and supplies power needed for the operation of various units via the internal bus 150.

The power supply 114 is a source of power needed for the operation of the digital camera 100. Examples of the power supply 114 include a secondary battery (lithium ion battery) and an alternating-current (AC) adapter. While the digital camera 100 can be used in connection with an AC adapter, the digital camera 100 basically is a portable device that can operate independently on power supply from a battery and can be carried around for use. As will be described below, the battery-driven digital camera 100 can be used as a wearable camera that is mounted on a helmet for use.

Figure 2B:
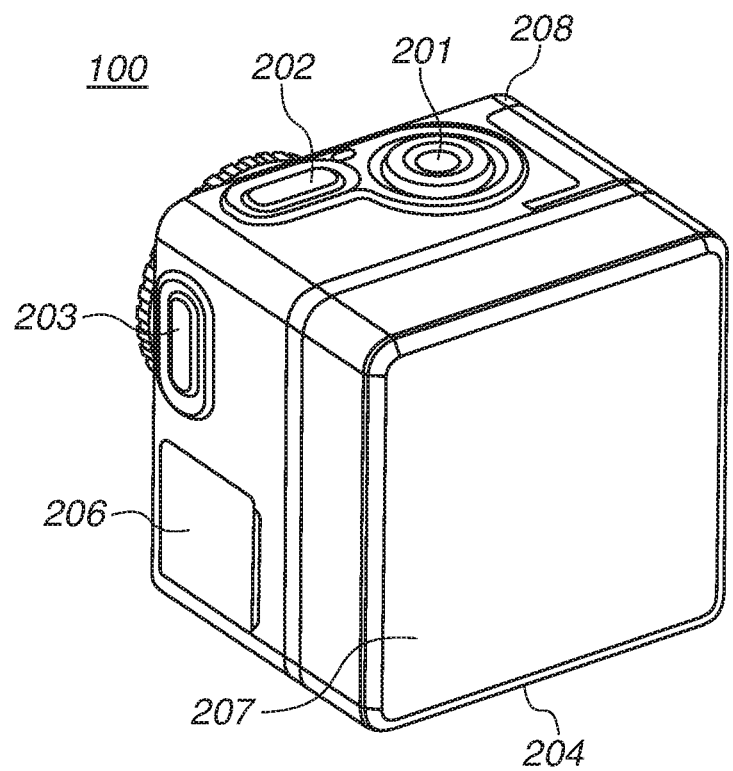

FIGS. 2A and 2B are diagrams illustrating external views of the digital camera 100. FIG. 2A is a perspective front view of the digital camera 100. FIG. 2B is a perspective rear view of the digital camera 100. The digital camera 100 according to the present exemplary embodiment has a compact, substantially cubic or rectangular solid shape with sides of approximately 1 to 3 cm each (a total of approximately 10 cm in length, width, and height). It will be understood that such a size is not restrictive. Due to such a compact shape, the number and locations of buttons of practical user-operable size that can be arranged are limited. An incidence surface of a lens of the camera unit 112 for object light (lens front surface) is arranged closer to a right side surface of the digital camera 100 with respect to the center of the front upper portion of the digital camera 100 (on the right side when the digital camera 100 is seen from the front). The display 105 is arranged on the front lower portion of the digital camera 100.

An imaging button 201 and a top button 202 are arranged on a top surface of the digital camera 100. Both the imaging button 201 and the top button 202 are push buttons. The digital camera 100 can be used in a situation where the user is unable to visually check the top surface of the digital camera 100. Examples of such a situation include when the digital camera 100 is mounted on a helmet. The imaging button 201 is configured to be larger than the top button 202 and have a different shape so that the user can distinguish between the imaging button 201 and the top button 202 by touch. More specifically, the imaging button 201 is circular, and the top button 202 is elliptic or rectangular. A side button 203 is arranged on the right side surface when the digital camera 100 is seen from the front (a left side surface when seen from behind; hereinafter, referred to as a right side surface). The side button 203 is a push button. As will be described below, the side button 203 is often used for paired operation with the top button 202. The top button 202 and the side button 203 are therefore configured to have substantially the same sizes and substantially the same shapes or substantially the same color so that the paired relationship between the top button 202 and the side button 203 can be easily seen or recognized by sight or by touch. The top button 202 and the side button 203 are arranged next to each other, but on respective different surfaces. There is no other operation member between the top button 202 and the side button 203. The top button 202 is arranged closer to the right side surface with respect to the center of the top surface. The side button 203 is arranged closer to the top surface with respect to the center of the right side surface. The imaging button 201 is arranged closer to the left side surface (closer to the surface opposite from the right side surface) with respect to the center of the top surface. The imaging button 201, the top button 202, and the side button 203 are included in the foregoing operation members 106. Suppose that the imaging button 201 is pressed in an imaging standby state. In a still image capturing mode, the CPU 101 captures a still image. In a moving image capturing mode, the CPU 101 starts to capture (record) a moving image. A still image is captured by a series of imaging processes in which the camera unit 112 performs autofocusing, the image sensor performs exposure (imaging) for still image capturing, and the image processing unit 104 processes the generated image data to generate a still image file and records the still image file on the recording medium 108. A moving image is captured by a series of imaging processes in which the camera unit 112 performs autofocusing, the image sensor performs exposure (imaging) for moving image capturing, and the image processing unit 104 processes the generated image data and records the resulting moving image file on the recording medium 108.

A screw hole for fixing the digital camera 100 to an installation tool, such as a tripod, is formed in the bottom surface of the digital camera 100. A connection terminal cover 205 is arranged on the left side surface of the digital camera 100 when seen from the front (the right side surface when seen from behind; hereinafter, referred to as a left side surface). With the connection terminal cover 205 open, there are a wired connection terminal (for example, a High-Definition Multimedia Interface (HDMI) (registered trademark) connection terminal) serving as the external I/F 109 and a wired connection terminal (for example, a Universal Serial Bus (USB) connection terminal) serving as the communication I/F 110. A lid 206 of a memory card slot for a memory card serving as the recording medium I/F 107 is arranged under the side button 203 on the right side surface of the digital camera 100. With the lid 206 open, there is the memory card slot. A rear cover unit 207 is arranged on the rear surface. With the rear cover unit 207 removed, there are connection terminals (including a power supply terminal and video input/output terminals) to which an additional power supply unit, a recorder unit, and a communication unit can be connected. The digital camera 100 may be configured to not include the rear cover unit 207. A light-emitting diode (LED) lamp 208 is arranged in a vertex portion formed by the top, front, and left side surfaces of the digital camera 100. The LED lamp 208 makes an operation notification to notify the user of various states of the digital camera 100 by flash patterns. The LED lamp 208 is visible from three directions, including from the top side, front side, and left side (left side when seen from the front) of the digital camera 100. The LED lamp 208 is arranged to be somewhat lower (closer to the rear) than the incident surface of the camera unit 112 so that the light emitted from the LED lamp 208 will not appear in the video image captured by the camera unit 112.

Suppose that the digital camera 100 is mounted on a helmet with the incident surface of the camera unit 112 directed forward. If the user wearing the helmet operates the digital camera 100 with the right hand, the digital camera 100 is operated from the left side when seen from the front. In such a case, the user is likely to operate the digital camera 100 in a blind state where the user is unable to visually observe the digital camera 100. When the user makes the operations, an erroneous operation such as unintentionally touching an operation member on the left side surface is not likely to occur since there is no operation member arranged on the left side surface of the digital camera 100. The user makes various setting operations before entering the blind state (for example, before wearing the helmet). The operations that the user makes in the blind state are often a start or stop of imaging. The imaging button 201 is therefore arranged on the top left to facilitate the operations in the blind state by the right hand from behind the digital camera 100. Since the incident surface of the camera unit 112 is arranged closer to the right side of the front surface of the digital camera 100 (to the left side when seen from behind), the possibilities for the finger of the right hand operating the imaging button 201 and the other fingers of the same right hand to unintentionally enter the imaging range and appear in the captured video image are reduced as well. Since the top button 202 and the side button 203 are arranged to the right as seen from the front of the digital camera 100, the user can easily make operations by the right hand in making various setting operations while viewing the display 105 (i.e., from the front). No operation member is arranged on the bottom surface of the digital camera 100 where operations are difficult to make when the digital camera 100 is fixed to a tripod or the like.

Next, setting processing of the digital camera 100 will be described with reference to the display examples of FIGS. 3A to 3F and the flowcharts of FIGS. 4 to 8. The processing in each of FIGS. 4 to 8 is implemented by loading a program recorded in the nonvolatile memory 103 into the memory 102 and executing the program by the CPU 101.

Figure 4:
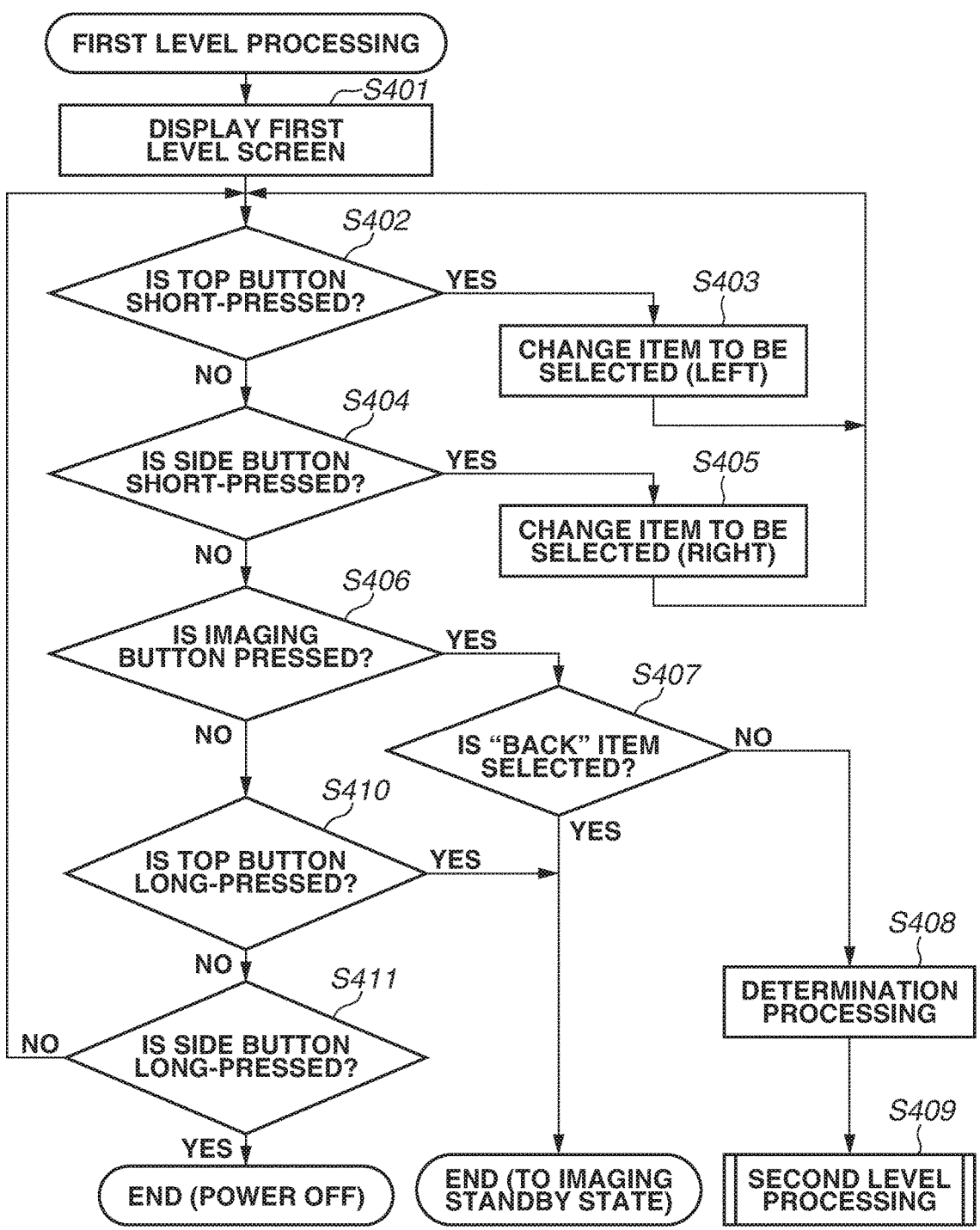
FIG. 4 is a flowchart illustrating first level processing.

FIG. 4 is a flowchart illustrating first level processing of a setting menu in the digital camera 100. If the digital camera 100 is powered on, the digital camera 100 enters an initial state (hereinafter, referred to as an imaging standby state). If the top button 202 is pressed in the imaging standby state, a first level screen (top menu) of the setting menu is displayed and the processing of FIG. 4 is started. That is, in the imaging standby state, the top button 202 functions as a menu button for displaying a setting menu screen.

Figure 3A:
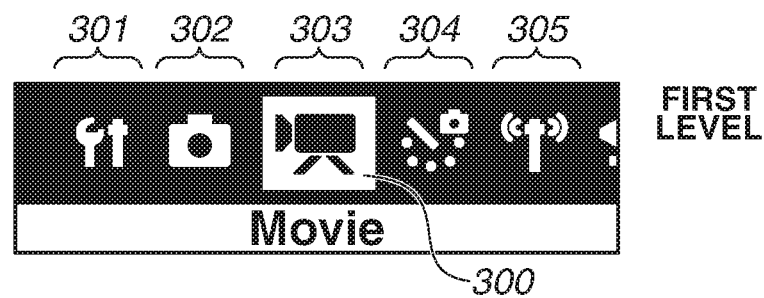
FIGS. 3A to 3F are diagrams illustrating display examples of a display.

In step S401, the CPU 101 displays the first level screen of the setting menu. The CPU 101 controls the image processing unit 104 and the display 105 to provide various displays on the display 105. FIG. 3A illustrates a display example of the first level screen of the setting menu displayed on the display 105 in step S401. The first level screen displays items 301 to 305 as selectable options (menu items) in a horizontal row. More items to be displayed exist to the right of the item 305. Such items can be displayed by scrolling. A cursor 300 indicates a selected item which is currently selected from among the plurality of options displayed on the first level screen. In the illustrated example, the item 303 is the selected item. Among the options displayed on the first level screen, the items not currently selected, i.e., those not indicated by the cursor 300 will be referred to as unselected items. In the illustrated example, the items 301, 302, 304, and 305 are the unselected items. The lower part of the screen is an area for displaying the description of the currently selected item. In the illustrated example, a character string (item name) "Movie" indicates that the currently selected item (item 303) is a menu item for making settings about a moving image.

In step S402, the CPU 101 determines whether the top button 202 is short-pressed. Here, the CPU 101 determines whether an operation by which the top button 202 is pressed and the pressed state is released within a predetermined time (hereinafter, referred to as a short press) is made. If the top button 202 is short-pressed (YES in step S402), the processing proceeds to step S403. If not (NO in step S402), the processing proceeds to step S404. In step S403, the CPU 101 changes the item to be selected to the one on the left of the item before the change. In other words, the CPU 101 selects the item on the left of the item selected before the short press of the top button 202. The first level screen uses a center focus method in which a plurality of menu items is arranged in a horizontal row and the item selected is always located in a specific position. If the item to be selected is changed to the one on the left, the cursor 300 remains unchanged in position but the item row moves to the right by one item. More specifically, if the top button 202 is short-pressed in the state of FIG. 3A once, the items 301 to 305 move (scroll) to the right by one and the item 302 comes to the position of the cursor 300, whereby the item 302 is selected.

In step S404, the CPU 101 determines whether the side button 203 is pressed. Here, the CPU 101 determines whether the side button 203 is short-pressed. If the side button 203 is short-pressed (YES in step S404), the processing proceeds to step S405. If not (NO in step S404), the processing proceeds to step S406. In step S405, the CPU 101 changes the item to be selected to the one on the right. In other words, the CPU 101 selects the item on the right of the item selected before the short press of the side button 203.

If the side button 203 is short-pressed in the state of FIG. 3A once, the items 301 to 305 move (scroll) to the left by one and the item 304 comes to the position of the cursor 300, whereby the item 304 is selected.

As described above, in the present exemplary embodiment, if the options are displayed in a horizontal row, the previous (left) item is selected according to the operation on the top button 202. The next (right) item is selected according to the operation on the side button 203. The reason is that the top button 202 is arranged on the left of the side button 203 when seen from the front of the digital camera 100 (to the user who operates the digital camera 100 while viewing the display 105). In other words, the previous (left) item can be selected by the operation on the operation member located relatively on the left. The next (right) item can be selected by the operation on the operation member located relatively on the right. In the case of a device with a directional operation member such as a directional pad, the previous (left) item is typically selected by an operation on a left button, and the next (right) item by an operation on a right button. The typical feeling of operation provided by the directional operation member such as a directional pad and the foregoing operations by the top button 202 and the side button 203 have a similar horizontal relationship in terms of the members to be operated when seen from the user. Thus, the foregoing operations by the top button 202 and the side button 203, though not made by a directional operation member, provide an intuitive, easy-to-understand feeling of operation for the user. The user can change the selected item to the left ones in succession by repeatedly pressing the top button 202, and change the selected item to the right ones in succession by repeatedly pressing the side button 203.

In step S406, the CPU 101 determines whether the imaging button 201 is pressed. If the imaging button 201 is pressed (YES in step S406), the processing proceeds to step S407. If not (NO in step S406), the processing proceeds to step S410. In the first level processing, the imaging button 201 functions as a determination button. In step S407, the CPU 101 determines whether the currently selected item is a "back" item. If the currently selected item is the "back" item (YES in step S407), the first level processing ends and the CPU 101 enters the imaging standby state. If the currently selected item is not the "back" item (NO in step S407), the processing proceeds to step S408. The digital camera 100 is small in size and thus has no room to arrange a "back" button as a hardware operation member. The "back" item is therefore provided as one of the menu items (options). The user can return to a menu level one level above by selecting the "back" item and making a determination operation. Since the first level screen is the top menu (top level), the CPU 101 clears (hides) the menu screen and enters the imaging standby state according to the "back" operation to one level above.

In step S408, the CPU 101 determines on the currently selected item. The processing proceeds to step S409. In step S409, the CPU 101 performs second level processing which is on the lower level of the selected item on the first level screen. For example, if the imaging button 201 is pressed with the item 303 selected as illustrated in FIG. 3A, the CPU 101 displays a setting menu of a moving image, which is on the lower level. Details of the second level processing will be described below with reference to FIG. 5.

In step S410, the CPU 101 determines whether the top button 202 is long-pressed (an operation in which the pressed state continues for a predetermined time or more). If the top button 202 is long-pressed (YES in step S410), the first level processing ends and the CPU 101 enters the imaging standby state. In menu screen processing according to the present exemplary embodiment, if the top button 202 is long-pressed, the CPU 101 can cancel (clear) the menu screen display (hide the menu screen display) and enter the imaging standby state regardless of the level of the menu displayed. This enables quick imaging without missing imaging opportunities. In addition, the user can quickly cancel the menu display and display the first level of the menu screen again, so that the user can quickly and easily redo operations from the top level if the user loses track of which level is currently displayed.

In step S411, the CPU 101 determines whether the side button 203 is long-pressed. If the side button 203 is not long-pressed (NO in step S411), the processing returns to step S402 and the CPU 101 repeats the processing. If the side button 203 is long-pressed (YES in step S411), the first level processing ends and the CPU 101 powers off the digital camera 100. The digital camera 100 is small in size and thus has no room to arrange a dedicated power button for power-on/off, either. Even without a power button, the digital camera 100 is thus configured to be capable of immediate power-off by the long press of the side button 203. If a dedicated power button is arranged and configured to be able to power off the digital camera 100 by a short press, the power button can possibly be mistook for another button and pressed to unintentionally turn off the power during an operation in blind state such as described above. By contrast, in the present exemplary embodiment, the absence of the dedicated power button reduces the possibilities that the user mistakes a button to operate for another button and erroneously operates the button during operations in blind state. Since the digital camera 100 can only be powered off by a long press, the possibility of unintended power-off by erroneous pressing is also reduced. The button 203 to be used for power-on/off is arranged on a surface different from the imaging button 201, so that the user making a button operation for an imaging instruction by touch will not accidentally turn off the power if the digital camera 100 is mounted and used on a helmet.

Figure 5:
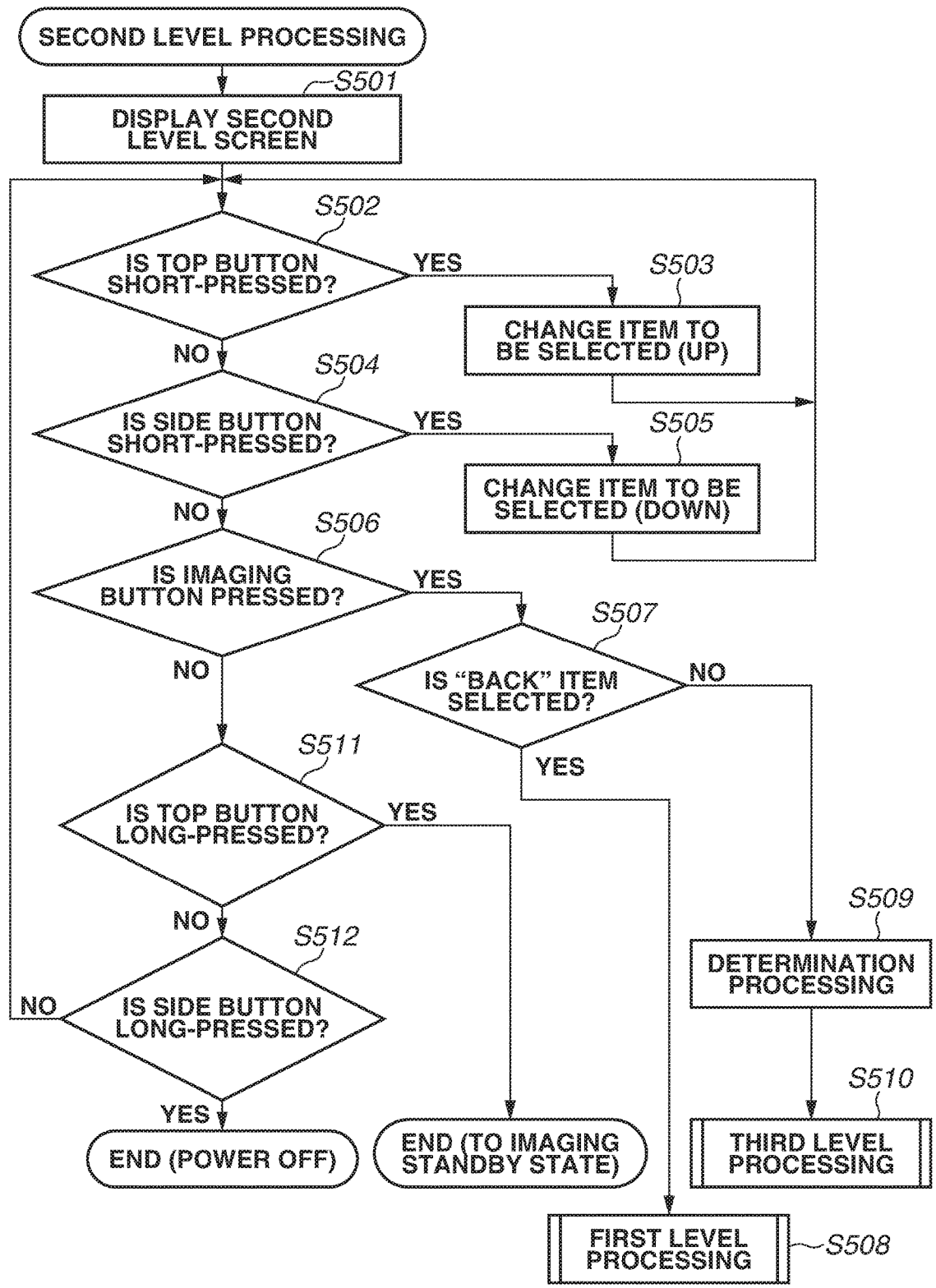
FIG. 5 is a flowchart illustrating second level processing.

FIG. 5 is a flowchart illustrating the second level processing in the foregoing step S409.

Figure 3B:

In step S501, the CPU 101 displays a second level screen of the setting menu. FIG. 3B illustrates a display example of the second level screen of the setting menu displayed on the display 105 in step S501. The second level screen displays an item 311 and an item 312 as selectable options (menu items) in a vertical row. More items to be displayed are further arranged below the item 312. Such items can be displayed by scrolling. A cursor 310 indicates a selected item which is currently selected from among the plurality of options displayed on the second level screen. An area 315 at the top of the second level screen is an area for indicating the contents of the current menu screen. In the illustrated example, the area 315 displays a moving image icon, which indicates that a setting menu related to a moving image is displayed as the second level screen.

In step S502, the CPU 101 determines whether the top button 202 is short-pressed. If the top button 202 is short-pressed (YES in step S502), the processing proceeds to step S503. If not (NO in step S502), the processing proceeds to step S504. In step S503, the CPU 101 changes the item to be selected to the one above. In other words, the CPU 101 selects the item immediately above the item selected before the short press of the top button 202. Unlike the first level screen, the second level screen does not employ the center focus method. If the cursor 310 is not located at the top of the displayed items, the item row remains unchanged in position but the position of the cursor 310 moves up by one item when the item to be selected is changed to the one above. If the cursor 310 is located at the top of the displayed items and there still is a selectable item above, the item row moves down by one item since the display position of the cursor 310 is not able to move further up. The item to be selected is thereby changed to the one above.

In step S504, the CPU 101 determines whether the side button 203 is short-pressed. If the side button 203 is short-pressed (YES in step S504), the processing proceeds to step S505. If not (NO in step S504), the processing proceeds to step S506. In step S505, the CPU 101 changes the item to be selected to the one below. In other words, the CPU 101 selects the item immediately below the item selected before the short press of the side button 203. If the cursor 310 is not located at the bottom of the displayed items, the item row remains unchanged in position but the position of the cursor 310 moves down by one item when the item to be selected is changed to the one below. If the cursor 310 is located at the bottom of the displayed items and there still is a selectable item below, the item row moves up by one item since the display position of the cursor 310 is not able to move further down. The item to be selected is thereby changed to the one below. If the side button 203 is short-pressed in the state of FIG. 3B once, the cursor 310 moves down by one item and the item 312 is selected.

As described above, in the present exemplary embodiment, if the options are displayed in a vertical row, the previous (immediately upper) item is selected according to the operation on the top button 202. The next (immediately lower) item is selected according to the operation on the side button 203. The reason is that the top button 202 is arranged above the side button 203 when seen from the front of the digital camera 100 (to the user who operates the digital camera 100 while viewing the display 105). In other words, the previous (immediately upper) item can be selected by the operation on the operation member located relatively above. The next (immediately lower) item can be selected by the operation on the operation member located relatively on the right (and below). In the case of a device with a directional operation member such as a directional pad, the previous (immediately upper) item is typically selected by an operation on an up button, and the next (immediately lower) item by an operation on a right button (or on a down button). The typical feeling of operation provided by the directional operation member such as a directional pad and the foregoing operations by the top button 202 and the side button 203 have a similar vertical relationship in terms of the members to be operated when seen from the user. Thus, the foregoing operations by the top button 202 and the side button 203, though not made by a directional operation member, provide an intuitive, easy-to-understand feeling of operation for the user. The user can change the selected item to the upper ones in succession by repeatedly pressing the top button 202, and change the selected item to the lower ones in succession by repeatedly pressing the side button 203.

In step S506, the CPU 101 determines whether the imaging button 201 is pressed. If the imaging button 201 is pressed (YES in step S506), the processing proceeds to step S507. If not (NO in step S506), the processing proceeds to step S511. The imaging button 201 functions as the determination button also in the second level processing. In step S507, the CPU 101 determines whether the currently selected item is a "back" item. If the currently selected item is the "back" item (YES in step S507), the processing proceeds to step S508. In step S508, the second level processing ends and the CPU 101 performs the first level processing which is one level higher (the processing proceeds to step S401 of FIG. 4). If the currently selected item is not the "back" item (NO in step S507), the processing proceeds to step S509.

In step S509, the CPU 101 determines on the currently selected item. The processing proceeds to step S510. In step S510, the CPU 101 performs third level processing that is on the lower level of the selected item on the second level screen. For example, if the imaging button 201 is pressed with the item 311 (item for exposure compensation) selected as in FIG. 3B, the CPU 101 displays a setting menu of exposure compensation which is on the lower level. Details of the third level processing will be described below with reference to FIGS. 6 and 7.

In step S511, the CPU 101 determines whether the top button 202 is long-pressed. If the top button 202 is long-pressed (YES in step S511), the second level processing ends and the CPU 101 enters the imaging standby state.

In step S512, the CPU 101 determines whether the side button 203 is long-pressed. If the side button 203 is long-pressed (YES in step S512), the second level processing ends and the CPU 101 powers off the digital camera 100. If the side button 203 is not long-pressed (NO in step S512), the processing returns to step S502 and the CPU 101 repeats the processing.

Figure 6:
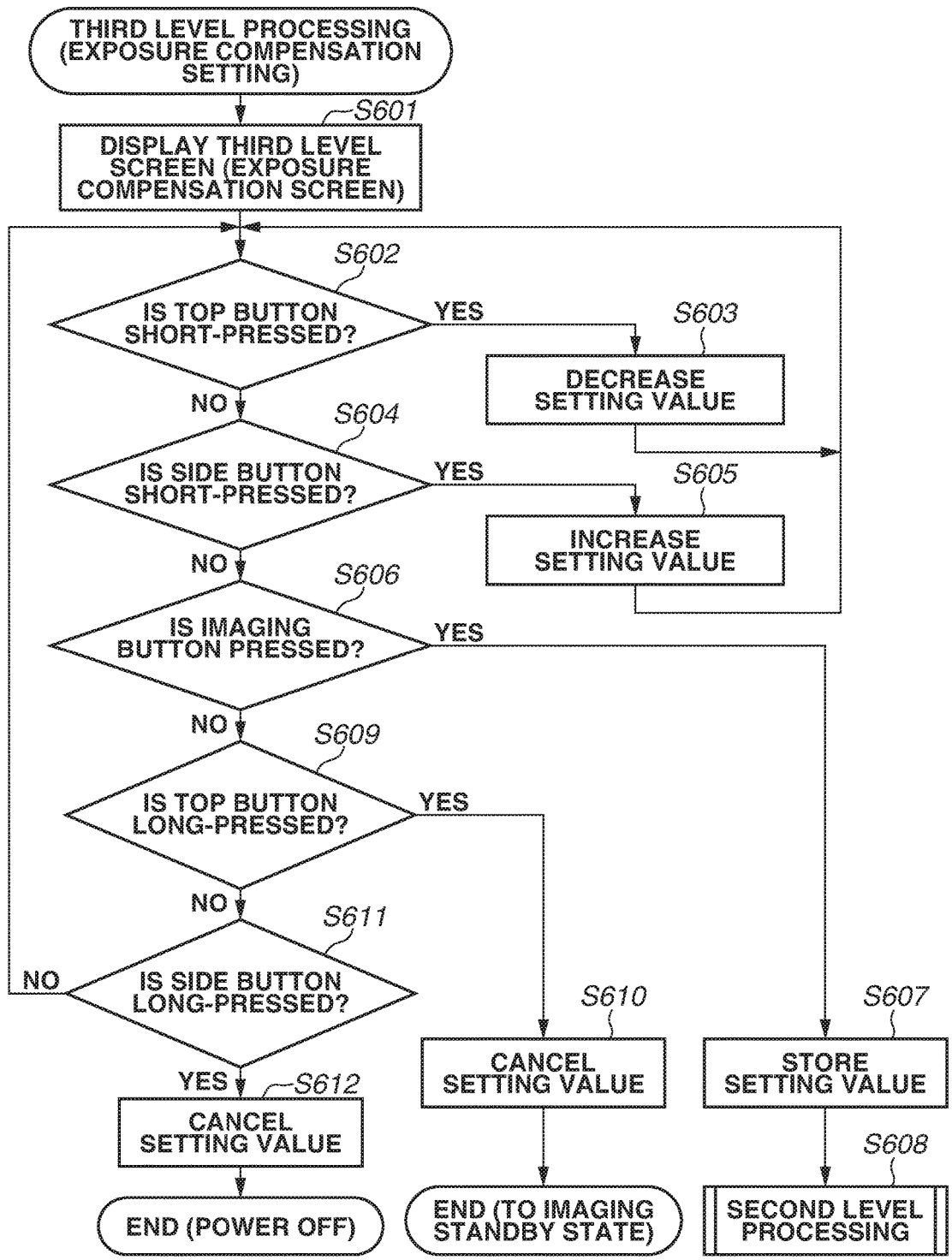
FIG. 6 is a flowchart illustrating exposure compensation setting processing as third level processing.

FIG. 6 is a flowchart illustrating exposure compensation setting processing which is an example of the third level processing in the foregoing step S510. Suppose that the imaging button 201 is pressed in a state where a setting item for exposure compensation is selected from among a plurality of menu items displayed on the setting menu related to a moving image, serving as the second level screen. In such a case, the CPU 101 starts the exposure compensation setting processing of FIG. 6 as the third level processing.

Figure 3C:
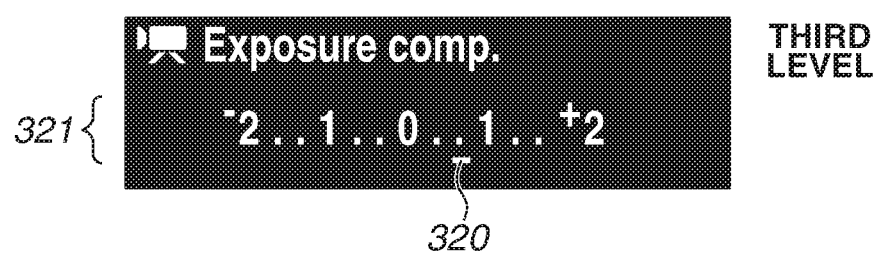

In step S601, the CPU 101 displays an exposure compensation screen which is a third level screen of the setting menu. FIG. 3C illustrates a display example of the exposure compensation screen as the third level screen displayed on the display 105 in step S601. The exposure compensation screen is a screen for setting exposure compensation. A character string indicating the setting screen of exposure compensation is displayed in the top row. A scale 321 for setting exposure compensation is displayed below. The scale 321 indicates that exposure compensation values of [−2] to [+2] can be set. The left side corresponds to smaller exposure compensation values, and the right side corresponds to larger exposure compensation values. The center represents a proper exposure automatically determined by the digital camera 100. In other words, the scale 321 is a list of candidate setting values for exposure compensation, horizontally arranged to increase from left to right. The setting value of exposure compensation is indicated by an index 320. The value of the scale 321 corresponding to the position of the index 320 is the current setting value of exposure compensation. The user sets a desired setting value by horizontally moving the index 320 (i.e., selecting a desired setting value from the candidate setting values indicated on the scale 321).

In step S602, the CPU 101 determines whether the top button 202 is short-pressed. If the top button 202 is short-pressed (YES in step S602), the processing proceeds to step S603. If not (NO in step S602), the processing proceeds to step S604. In step S603, the CPU 101 moves the index 320 to the left. This decreases the setting value of exposure compensation (changes the setting value to a smaller one). For example, if the top button 202 is short-pressed once in a state where the exposure compensation value is set to [+⅔]

as in FIG. 6C, the CPU 101 moves the index 320 to the left by one marking. The exposure compensation value is thereby set to [+⅓].

In step S604, the CPU 101 determines whether the side button 203 is short-pressed. If the side button 203 is short-pressed (YES in step S604), the processing proceeds to step S605. If not (NO in step S604), the processing proceeds to step S606. In step S605, the CPU 101 moves the index 320 to the right. This increases the setting value of exposure compensation (changes the setting value to a larger one). For example, if the side button 203 is short-pressed once in a state where the exposure compensation value is set to [+⅔] as in FIG. 6C, the CPU 101 moves the index 320 to the right by one marking. The exposure compensation value is thereby set to [+1].

As described above, in the present exemplary embodiment, when such a display element as the index 320 is horizontally moved, the CPU 101 moves the display element to the left to decrease the setting value according to the operation on the top button 202. The CPU 101 moves the display element to the right to increase the setting value according to the operation on the side button 203. In other words, when a setting value is selected from a list of candidate setting values horizontally arranged to increase from left to right, the CPU 101 decreases the setting value according to the operation on the top button 202. The CPU 101 increases the setting value according to the operation on the side button 203. The reason is that the top button 202 is arranged on the left of the side button 203 when seen from the front of the digital camera 100 (to the user who operates the digital camera 100 while viewing the display 105). In other words, the display element can be moved to the left (the numerical value can be decreased) by the operation on the operation member located relatively on the left. The display element can be moved to the right (the numerical value can be increased) by the operation on the operation member located relatively on the right. In the case of a device with a directional operation member such as a directional pad, the display element is typically moved to the left (the numerical value decreased) by an operation on a left button, and the display element is typically moved to the right (the numerical value increased) by an operation on a right button. Even in a case where a method in which the display element is not moved is employed, when inputting a numerical value by the left and right buttons (left and right keys), the numerical value is typically decreased by the left button and increased by the right button. The typical feeling of operation provided by the directional operation member such as a directional pad and the foregoing operations by the top button 202 and the side button 203 have a similar horizontal relationship in terms of the members to be operated when seen from the user. Thus, the foregoing operations by the top button 202 and the side button 203, though not made by a directional operation member, provide an intuitive, easy-to-understand feeling of operation for the user. The user can successively move the index 320 to the left (decrease the numerical value) by repeatedly pressing the top button 202, and successively move the index 320 to the right (increase the numerical value) by repeatedly pressing the side button 203.

In step S606, the CPU 101 determines whether the imaging button 201 is pressed. If the imaging button 201 is pressed (YES in step S606), the processing proceeds to step S607. If not (NO in step S606), the processing proceeds to step S609. The imaging button 201 functions as the determination button also in the third level processing. In step S607, the CPU 101 sets the exposure compensation value corresponding to the current position of the index 320 as the setting value, and records (stores) the setting value in the nonvolatile memory 103. The setting value thus set is reflected on the next imaging operation. During the next imaging operation, the camera unit 112 performs imaging with the set exposure compensation value. With the setting value stored, the processing proceeds to step S608. In step S608, the third level processing ends and the CPU 101 performs the second level processing which is one level higher (the processing proceeds to step S501 of FIG. 5).

In step S609, the CPU 101 determines whether the top button 202 is long-pressed. If the top button 202 is long-pressed (YES in step S609), the processing proceeds to step S610. If not (NO in step S609), the processing proceeds to step S611. In step S610, the CPU 101 cancels the exposure compensation value (not-stored setting value) increased or decreased by the user after the display of the screen for exposure compensation, and enters the imaging standby state. That is, the exposure compensation value is not changed and the setting value before the processing of FIG. 6 is maintained.

In step S611, the CPU 101 determines whether the side button 203 is long-pressed. If the side button 203 is long-pressed (YES in step S611), the processing proceeds to step S612. In step S612, the CPU 101 cancels the not-stored setting value as in step S610, and powers off the digital camera 100. If the side button 203 is not long-pressed (NO in step S611), the processing returns to step S602 and the CPU 101 repeats the processing.

Figure 7:
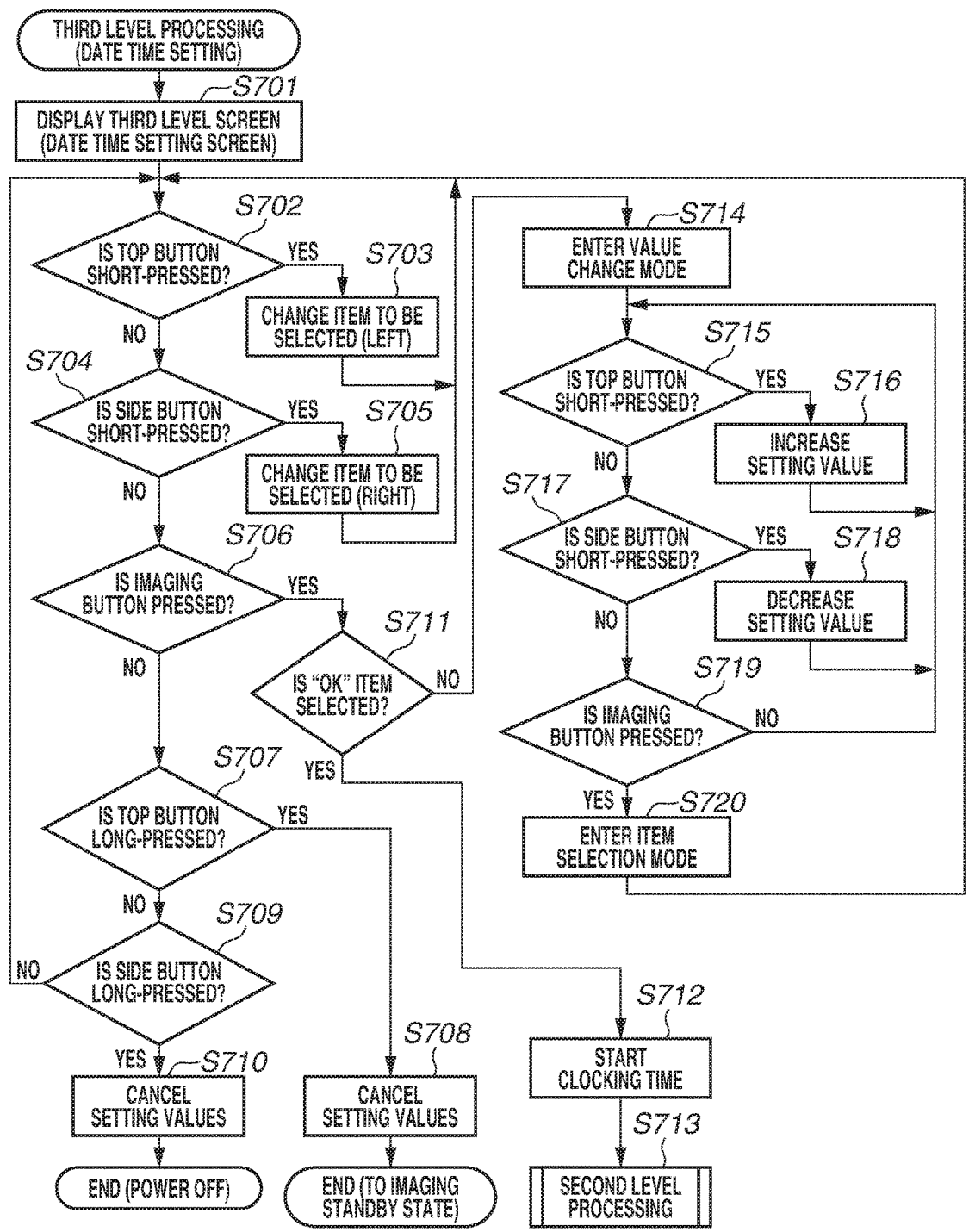
FIG. 7 is a flowchart illustrating date time setting processing as third level processing.

FIG. 7 is a flowchart illustrating date time setting processing which is another example of the third level processing in the foregoing step S510. If an item related to main body setting is selected and determined on the first level screen, a main body setting menu serving as a second level screen is displayed. If the imaging button 201 is pressed in a state where an item for date time setting is selected from among a plurality of menu items displayed on the main body setting menu, the CPU 101 starts the date time setting processing of FIG. 7 as third level processing.

Figure 3D:
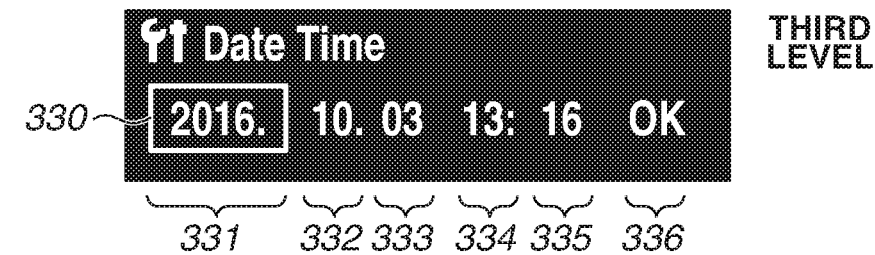

In step S701, the CPU 101 displays a date time setting screen which is a third level screen of the setting menu. FIG. 3D illustrates a display example of the date time setting screen as the third level screen displayed on the display unit 105 in step S701. The date time setting screen displays a year item 331, a month item 332, a day item 333, an hour item 334, a minute item 335, and an "OK" item 336 as selectable options in a horizontal row. The user selects one of such items in an item selection mode, and shifts to a value change mode to set a numerical value of the selected item. FIG. 3D illustrates the date time setting screen in the item selection mode. A cursor 330 indicates the currently selected item.

In step S702, the CPU 101 determines whether the top button 202 is short-pressed. If the top button 202 is short-pressed (YES in step S702), the processing proceeds to step S703. If not (NO in step S702), the processing proceeds to step S704. In step S703, the CPU 101 changes the item to be selected to the one on the left. The date time setting screen does not employ the center focus method. If the cursor 330 is located at an item other than the leftmost one of the displayed items and the item to be selected is changed to the one on the left, the item row remains unchanged in position but the position of the cursor 330 moves to the left by one item. If the top button 202 is short-pressed with the cursor 330 at the leftmost one of the displayed items, the item to be selected is changed to the one at the other end (right end). More specifically, if the top button 202 is short-pressed in the state of FIG. 3D once, the cursor 330 moves to the "OK" item 336 which is the item at the right end.

In step S704, the CPU 101 determines whether the side button 203 is short-pressed. If the side button 203 is short-pressed (YES in step S704), the processing proceeds to step S705. If not (NO in step S704), the processing proceeds to step S706. In step S705, the CPU 101 changes the item to be selected to the one on the right. If the cursor 330 is not located at the rightmost one of the displayed items and the item to be selected is changed to the one on the right, the item row remains unchanged in position but the position of the cursor 330 moves to the right by one item. If the side button 203 is short-pressed in the state of FIG. 3D once, the cursor 330 moves to the right by one item and the month item 332 is selected. If the cursor 330 is located at the rightmost one of the displayed items and the side button 203 is short-pressed, the item to be selected is changed to the one at the other end (left end).

In step S706, the CPU 101 determines whether the imaging button 201 is pressed. If the imaging button 201 is pressed (YES in step S706), the processing proceeds to step S711. If not (NO in step S706), the processing proceeds to step S707. In step S707, the CPU 101 determines whether the top button 202 is long-pressed. If the top button 202 is long-pressed (YES in step S707), the processing proceeds to step S708. If not (NO in step S707), the processing proceeds to step S709. In step S708, the CPU 101 cancels the numerical values (not-stored setting values) of the year, month, day, hour, and minute input by the user after the display of the date time setting screen, and enters the imaging standby state. In other words, the year, month, day, hour, and minute are not changed. In step S709, the CPU 101 determines whether the side button 203 is long-pressed. If the side button 203 is long-pressed (YES in step S709), the processing proceeds to step S710. In step S710, the CPU 101 cancels the not-stored setting values as in step S708, and powers off the digital camera 100. If the side button 203 is not long-pressed (NO in step S709), the processing returns to step S702 and the CPU 101 repeats the processing.

In step S711, the CPU 101 determines whether the currently selected item is the "OK" item 336. If the currently selected item is the "OK" item 336 (YES in step S711), the processing proceeds to step S712. If not (NO in step S711), the processing proceeds to step S714. In step S712, the CPU 101 stores the numerical values of the year, month, day, hour, and minute input by the user after the display of the date time setting screen as setting values, and starts clocking time at the year, month, day, hour, and minute. With the date time settings thus changed, the processing proceeds to step S713. In step S713, the third level processing ends and the CPU 101 performs the second level processing which is one level higher (the processing proceeds to step S501 of FIG. 5).

Figure 3E:
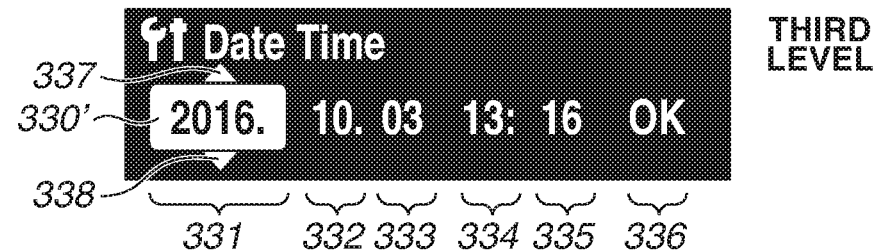

In step S714, the CPU 101 determines that the item selected when the imaging button 201 is pressed is the target item to change the numerical value of. The CPU 101 changes the item selection mode to a value change mode. Entering the value change mode, the CPU 101 updates display to a corresponding display state. FIG. 3E illustrates a display example of the date time setting screen in the value change mode. A display form of the cursor changes from the frame-shaped display form like the cursor 330 of FIG. 3D to one that highlights the numerical value like a cursor 330' of FIG. 3E. The cursor 330' indicates a numerical value display area of the numerical value to be changed. In addition, an upward direction mark 337 and a downward direction mark 338 are displayed above and below the numerical value of the selected item in association with the numerical value displayed in the numerical value display area. The up and downward direction marks 337 and 338 indicate that the numerical value is in a state of being changed. The upward direction mark 337 is a mark indicating that the numerical value can be increased. The downward direction mark 338 is a mark indicating that the numerical value can be decreased.

In step S715, the CPU 101 determines whether the top button 202 is short-pressed. If the top button 202 is short-pressed (YES in step S715), the processing proceeds to step S716. If not (NO in step S715), the processing proceeds to step S717. In step S716, the CPU 101 increases the setting value of the selected item. For example, if the top button 202 is short-pressed in the state of FIG. 6E once, the value of the year changes from "2016" to "2017". Both the display position of the numerical value of the year to be changed and the position of the cursor 330' remain unchanged before and after the change of the numerical value.

In step S717, the CPU 101 determines whether the side button 203 is short-pressed. If the side button 203 is short-pressed (YES in step S717), the processing proceeds to step S718. If not (NO in step S717), the processing proceeds to step S719. In step S718, the CPU 101 decreases the setting value of the selected item. For example, if the side button 203 is short-pressed in the state of FIG. 6E once, the value of the year changes from "2016" to "2015". Both the display position of the numerical value of the year to be changed and the position of the cursor 330' remain unchanged before and after the change of the numerical value.

As described above, when a numerical value displayed in the numerical value display area is changed at that position or when the up and downward direction marks 337 and 338 indicating up and down directions are displayed on the numerical value display area, the CPU 101 increases the numerical value according to the operation on the top button 202. The CPU 101 decreases the numerical value according to the operation on the side button 203. The reason is that the top button 202 is arranged above the side button 203 when seen from the front of the digital camera 100 (to the user who operates the digital camera 100 while viewing the display 105). In other words, the numerical value can be increased by the operation on the operation member located relatively above. The numerical value can be decreased by the operation on the operation member located relatively below. In the case of a device with a directional operation member such as a directional pad, the numerical value is typically increased by an operation on an up button, and the numerical value is typically decreased by an operation on a down button. The typical feeling of operation provided by the directional operation member such as a directional pad and the foregoing operations by the top button 202 and the side button 203 have a similar vertical relationship in terms of the members to be operated when seen from the user. Thus, the foregoing operations by the top button 202 and the side button 203, though not made by a directional operation member, provide an intuitive, easy-to-understand feeling of operation for the user. The user can successively increase the numerical value by repeatedly pressing the top button 202, and successively decrease the numerical value by repeatedly pressing the side button 203. The changes of the numerical value by the top button 202 and the side button 203 in steps S715 to S718 and the changes of the numerical value by the top button 202 and the side button 203 in the foregoing steps S602 to S605 have a reverse relationship in terms of increase and decrease. This is ascribable to a difference in the display form of the numerical setting screen. Such processing is intended to provide a more intuitive feeling of operation for the user according to the screen display in setting the numerical value.

In step S719, the CPU 101 determines whether the imaging button 201 is pressed. If the imaging button 201 is pressed (YES in step S719), the processing proceeds to step S720. If not (NO in step S719), the processing returns to step S716 and the CPU 101 repeats the processing. In step S720, the CPU 101 changes the value change mode to the item selection mode. Entering the item selection mode, the CPU 101 updates the display to a corresponding display state. The display state like FIG. 3E transitions to the display state like FIG. 3D.

Figure 8:
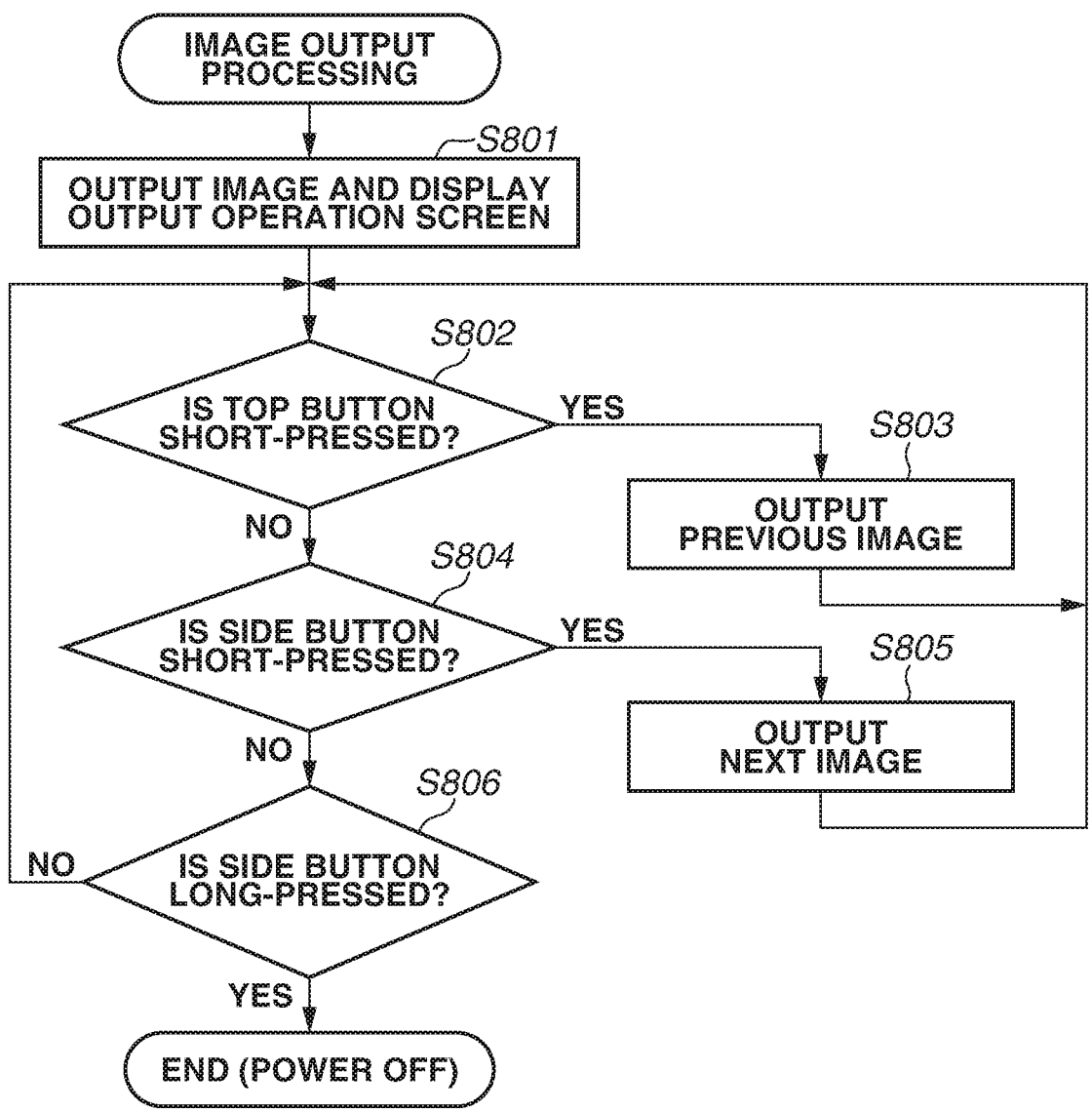
FIG. 8 is a flowchart illustrating image output processing.

FIG. 8 is a flowchart illustrating image output processing. The digital camera 100 can output a video image to an external apparatus via the external I/F 109. For example, the CPU 101 can output an image stored in the recording medium 108 to an external display that is connected via the external I/F 109 through a connection cable. If a plurality of images is stored in the recording medium 108, the image to be output to the external display is switched by operations on the top button 202 and the side button 203. Details of such processing will be described with reference to the flowchart of FIG. 8. The processing of FIG. 8 is started when the digital camera 100 and the external display are connected and the digital camera 100 becomes ready to output an image to the external display.

Figure 3F:

In step S801, the CPU 101 reads an image stored in the recording medium 108 via the recording medium I/F 107, and outputs the image to the external display through the external I/F 109. The CPU 101 further displays an output operation screen on the display 105. FIG. 3F illustrates a display example of the output operation screen. The output operation screen displays a message that the image to be output to the external display can be switched by operating the top button 202 and the side button 203. In the illustrated example, for convenience sake, a number "202" is displayed as a number representing the top button 202, and a number "203" as a number representing the side button 203. It will be understood that the names of the operation members or icons representing the operation members may be displayed instead.

In step S802, the CPU 101 determines whether the top button 202 is short-pressed. If the top button 202 is short-pressed (YES in step S802), the processing proceeds to step S803. If not (NO in step S802), the processing proceeds to step S804. In step S803, the CPU 101 switches the image to be output (image to be displayed on the external display) from the current image to the previous image in predetermined order of arrangement. Examples of the predetermined order of arrangement include the order of file names and the order of imaging dates and times. If the image before switching is the first (start) image in the predetermined order of arrangement, the image is switched to the last (end) image in the predetermined order of arrangement.

In step S804, the CPU 101 determines whether the side button 203 is short-pressed. If the side button 203 is short-pressed (YES in step S804), the processing proceeds to step S805. If not (NO in step S804), the processing proceeds to step S806. In step S805, the CPU 101 switches the image to be output (image to be displayed on the external display) from the current image to the next image in the predetermined order of arrangement. If the image before switching is the last (end) image in the predetermined order of arrangement, the image is switched to the first (start) image in the predetermined order of arrangement.

In step S806, the CPU 101 determines whether the side button 203 is long-pressed. If the side button 203 is not long-pressed (NO in step S806), the processing returns to step S802 and the CPU 101 repeats the processing. If the side button 203 is long-pressed (YES in step S806), the CPU 101 powers off the digital camera 100.

As described above, in the present exemplary embodiment, if the image to be output is switched, the CPU 101 switches the image to be displayed to the previous image according to the operation on the top button 202. The CPU 101 switches the image to be displayed to the next image according to the operation on the side button 203. The reason is that the top button 202 is arranged on the left of the side button 203 when seen from the front of the digital camera 100 (to the user who operates the digital camera 100 while viewing the display 105). In other words, the image to be displayed can be switched to the previous image by the operation on the operation member located relatively on the left. The image to be displayed can be switched to the next image by the operation on the operation member located relatively on the right. In the case of a device with a directional operation member such as a directional pad, the image is typically switched to the previous one by an operation on a left button, and switched to the next one by an operation on a right button. The typical feeling of operation provided by the directional operation member such as a directional pad and the foregoing operations by the top button 202 and the side button 203 have a similar horizontal relationship in terms of the members to be operated when seen from the user. Thus, the foregoing operations by the top button 202 and the side button 203, though not made by a directional operation member, provide an intuitive, easy-to-understand feeling of operation for the user. The user can switch the image to be displayed to the previous images in succession by repeatedly pressing the top button 202, and switch the image to be displayed to the next images in succession by repeatedly pressing the side button 203.

In the foregoing second level processing of FIG. 5, the top button 202 is described to be pressed to change the item to be selected to the one above, and the side button 203 is described to be pressed to change the item to be selected to the one below. However, in some screens in which items are vertically arranged, the top button 202 may be pressed to change the item to be selected to the one below, and the side button 203 may be pressed to change the item to be selected to the one above.

Figure 9A:
FIGS. 9A to 9C are diagrams illustrating display examples of the display.
Figure 9B:
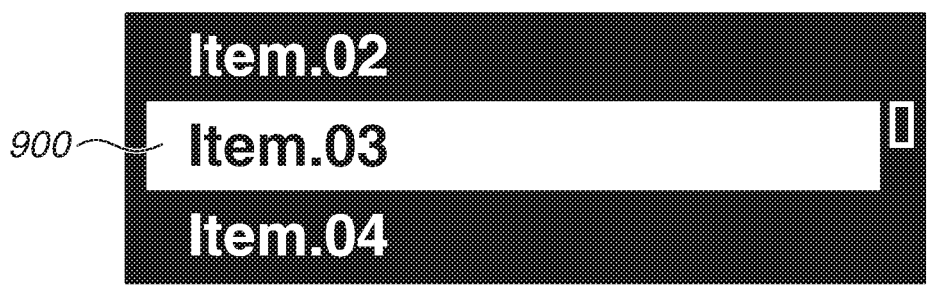
Figure 9C:

FIGS. 9A to 9C are diagrams illustrating display examples of a screen in which items are arranged in a vertical row, the top button 202 can be pressed to change the item to be selected to the one below, and the side button 203 can be pressed to change the item to be selected to the one above. The screen of FIGS. 9A to 9C can display only three of ten items (options) including Item.01 to Item.10 at a time. The screen of FIGS. 9A to 9C uses the center focus method. Even when the selected item is changed, a focus 900 (identifier indicating the item selected) is displayed at a constant position. When the item to be selected is changed, the group of items moves.

If the side button 203 is pressed in the state of FIG. 9A, the selected item is changed from Item.04 to Item.03 which is the item above. FIG. 9B illustrates the resulting state. Before and after the switching, the focus 900 remains at the constant position, and Item.02 to Item.05 move down as a whole by one item. Since the downward moving direction of Item.02 to Item.05 is associated with the vertical relationship that the side button 203 is arranged relatively below the top button 202, a feeling of operation without a sense of strangeness is provided. Such a moving direction is also associated with a feeling of selecting a lower item in the order of arrangement of the items. Similarly, if the side button 203 is pressed in the state of FIG. 9B, the selected item is changed from Item.03 to Item.02 which the item above. FIG. 9C illustrates the resulting state.

Conversely, if the top button 202 is pressed in the state of FIG. 9C, the selected item is changed from Item.02 to Item.03 which is the item below. FIG. 9B illustrates the resulting state. Before and after the switching, the focus 900 remains at the constant position and Item.01 to Item.04 move up as a whole by one item. Since the upward moving direction of Item.01 to Item.04 is associated with the vertical relationship that the top button 202 is arranged relatively above the side button 203, a feeling of operation without a sense of strangeness is provided. Such a moving direction is also associated with a feeling of selecting an upper item in the order of arrangement of the items. Similarly, if the top button 202 is pressed in the state of FIG. 9B, the selected item is changed from Item.03 to Item.04 which is the item below. FIG. 9A illustrates the resulting state.

The exemplary embodiment of the disclosure has been described in detail. However, the disclosure is not limited to such a specific exemplary embodiment, and various modes of embodiment not departing from the gist of the disclosure are also included in the disclosure. The foregoing exemplary embodiment is merely illustrative of an embodiment of the disclosure. Exemplary embodiments may be combined as appropriate.

The foregoing various types of control described to be performed by the CPU 101 may be performed by a single piece of hardware. A plurality of pieces of hardware may perform processing in a distributed manner to control the entire apparatus.

In the foregoing example, the top button 202 and the side button 203 are described to be push buttons. However, the operation member arranged on the top surface and the operation member arranged on the side surface are not limited to push buttons. More specifically, operation members of other methods may be used, including an operation member for detecting a touch, an operation member for detecting pressure, an operation member for detecting distortion, and a lever.

The foregoing exemplary embodiment is described to be applied to the digital camera 100. However, such an example is not restrictive. An exemplary embodiment may be applied to an electronic device that includes operation members on a top surface and a side surface thereof. More specifically, an exemplary embodiment is applicable to a mobile phone terminal, a portable image viewer, a digital photo frame, a music player, a game machine, an electronic book reader, a tablet terminal, a smartphone, remote controllers of various electronic devices, a home appliance, and a car-mounted device.

According to an electronic device of an exemplary embodiment, the user can make intuitive operations even when using operation members provided on different surfaces of the electronic device.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-037716, filed Feb. 28, 2017, which is hereby incorporated by reference herein in its entirety.

What is claimed is:
1. An electronic apparatus comprising:
a display unit arranged on a first surface of the electronic apparatus;
a first operation member arranged on a second surface of the electronic apparatus;
a second operation member arranged on a third surface of the electronic apparatus, wherein the third surface is on a right side of the electronic apparatus when the first and second surfaces are viewed as front and top sides, respectively, of the electronic apparatus; and
a memory and at least one processor or circuit which function as:
a control unit configured to perform control to change an item to be selected from among a plurality of items displayed on the display unit to a previous item according to an operation on the first operation member and change the item to be selected to a next item according to an operation on the second operation member.

2. The electronic apparatus according to claim 1, wherein the control unit is configured to, in a case where the plurality of items is a group of items displayed on the display unit in a horizontal row, perform control to select a left item of the item selected before change according to the operation on the first operation member and perform control to select a right item of the item selected before change according to the operation on the second operation member.

3. The electronic apparatus according to claim 1, wherein the control unit is configured to, in a case where the plurality of items is a group of items displayed on the display unit in a vertical row, perform control to select an item above the item selected before change according to the operation on the first operation member and perform control to select an item below the item selected before change according to the operation on the second operation member.

4. The electronic apparatus according to claim 1, wherein the control unit is configured to, in a case where a first screen is displayed on the display unit, perform control to change the item to be selected from among the plurality of items to the previous item according to the operation on the first operation member and change the item to be selected to the next item according to the operation on the second operation member, the first screen being configured so that the plurality of items is displayed as options, and, when the item to be selected from among the plurality of items is changed in a state where an item other than one displayed at an end of the displayed items is selected, the plurality of items remains unchanged in position but a cursor indicating selection moves in position.

5. The electronic apparatus according to claim 1, wherein the control unit is configured to, in a case where a second screen configured to display a plurality of candidate setting values about a specific setting item is displayed on the display unit, perform control to change a setting value to be selected from among the plurality of candidate setting values to a smaller setting value according to the operation on the first operation member and change the setting value to be selected to a larger setting value according to the operation on the second operation member.

6. The electronic apparatus according to claim 1, wherein the control unit is configured to, in a case where a third screen on which a numerical value displayed in a display area is changed is displayed on the display unit, perform control to increase the numerical value to be changed according to the operation on the first operation member and decrease the numerical value to be changed according to the operation on the second operation member, the display area remaining unchanged in position before and after a change of the numerical value to be changed.

7. The electronic apparatus according to claim 1, wherein the control unit is configured to, in a case where a fourth screen is displayed on the display unit, perform control to change the item to be selected from among the plurality of items to the next item according to the operation on the first operation member and change the item to be selected from among the plurality of items to the previous item according to the operation on the second operation member, the fourth screen being configured so that the plurality of items is displayed as options, and, when the item to be selected from among the plurality of items is changed, an identifier indicating the selected item remains unchanged in position but the plurality of items moves in position.

8. The electronic apparatus according to claim 7, wherein the control unit is configured to, in the case where the fourth screen is displayed on the display unit, perform control to move a display position of the plurality of items up according to the operation on the first operation member and move the display position of the plurality of items down according to the operation on the second operation member.

9. The electronic apparatus according to claim 1, wherein the first operation member is arranged on the second surface to be closer to the third surface than a center of the second surface, the second operation member is arranged on the third surface to be closer to the second surface than a center of the third surface, and no other operation member is arranged between the first operation member and the second operation member.

10. The electronic apparatus according to claim 1, further comprising:
an imaging unit; and
a third operation member configured to instruct the imaging unit to capture an image, the third operation member being arranged on the second surface.

11. The electronic apparatus according to claim 10,
wherein the electronic apparatus is capable of being powered off according to a specific operation on the second operation member, and
wherein the electronic apparatus is not capable of being powered off according to an operation on the first operation member or the third operation member.

12. The electronic apparatus according to claim 10, wherein the control unit is configured to perform control to hide a setting menu screen displayed on the display unit without powering off the electronic apparatus according to a specific operation on the first operation member.

13. The electronic apparatus according to claim 10, wherein an incident surface of object light to the imaging unit is arranged on the first surface to be closer to the third surface than a center of the first surface, and the third operation member is arranged on the second surface to be closer to a surface opposite from the third surface than the center of the second surface.

14. The electronic apparatus according to claim 1, wherein no operation member is arranged on a surface opposite from the first surface, a surface opposite from the second surface, or a surface opposite from the third surface.

15. The electronic apparatus according to claim 1, wherein a screw hole for fixing the electronic apparatus to an installation tool is formed in a surface opposite from the second surface.

16. An electronic apparatus comprising:
a display unit arranged on a first surface of the electronic apparatus;
a first operation member arranged on a second surface of the electronic apparatus;
a second operation member arranged on a third surface of the electronic apparatus, wherein the third surface is on a right side of the electronic apparatus when the first and second surfaces are viewed as front and top sides, respectively, of the electronic apparatus; and
a memory and at least one processor or circuit which function as:
a control unit configured to perform control to change a setting value to be selected from among a plurality of candidate setting values displayed on the display unit to a smaller setting value according to an operation on the first operation member and change the setting value to be selected to a larger setting value according to an operation on the second operation member.

17. An electronic apparatus comprising:
a display unit arranged on a first surface of the electronic apparatus;
a first operation member arranged on a second surface of the electronic apparatus;
a second operation member arranged on a third surface of the electronic apparatus, wherein the third surface is on a right side of the electronic apparatus when the first and second surfaces are viewed as front and top sides, respectively, of the electronic apparatus; and
a memory and at least one processor or circuit which function as:
a control unit configured to perform control to increase a numerical value to be changed according to an operation on the first operation member and decrease the numerical value to be changed according to an operation on the second operation member, the numerical value to be changed being displayed in a display area on the display unit, the display area remaining unchanged in position before and after a change of the numerical value to be changed.

18. The electronic apparatus according to 17, wherein a mark indicating an upward direction and a mark indicating a downward direction are displayed in association with the numerical value to be changed displayed on the display unit.

19. An electronic apparatus comprising:
a display unit arranged on a first surface of the electronic apparatus;
a first operation member arranged on a second surface of the electronic apparatus;
a second operation member arranged on a third surface of the electronic apparatus, wherein the third surface is on a right side of the electronic apparatus when the first and second surfaces are viewed as front and top sides, respectively, of the electronic apparatus; and
a memory and at least one processor or circuit which function as:
a control unit configured to perform control to move a plurality of items displayed on the display unit up according to an operation on the first operation member and move the plurality of items down according to an operation on the second operation member.

20. A method for controlling an electronic apparatus including a display unit arranged on a first surface of the electronic apparatus, a first operation member arranged on a second surface of the electronic apparatus, and a second operation member arranged on a third surface of the electronic apparatus, wherein the third surface is on a right side of the electronic apparatus when the first and second surfaces are viewed as front and top sides, respectively, of the electronic apparatus, the method comprising:
performing control to change an item to be selected from among a plurality of items displayed on the display unit to a previous item according to an operation on the first operation member and change the item to be selected to a next item according to an operation on the second operation member.

21. A computer-readable non-transitory storage medium storing a program for causing a computer to perform the method for controlling an electronic apparatus according to claim 20.

22. A method for controlling an electronic apparatus including a display unit arranged on a first surface of the electronic apparatus, a first operation member arranged on a second surface of the electronic apparatus, and a second operation member arranged on a third surface of the electronic apparatus, wherein the third surface is on a right side of the electronic apparatus when the first and second surfaces are viewed as front and top sides, respectively, of the electronic apparatus, the method comprising
performing control to change a setting value to be selected from among a plurality of candidate setting values displayed on the display unit to a smaller setting value according to an operation on the first operation member and change the setting value to be selected to a larger setting value according to an operation on the second operation member.

23. A computer-readable non-transitory storage medium storing a program for causing a computer to perform the method for controlling an electronic apparatus according to claim 22.

24. A method for controlling an electronic apparatus including a display unit arranged on a first surface of the electronic apparatus, a first operation member arranged on a second surface of the electronic apparatus, and a second operation member arranged on a third surface of the electronic apparatus, wherein the third surface is on a right side of the electronic apparatus when the first and second surfaces are viewed as front and top sides, respectively, of the electronic apparatus, the method comprising
performing control to increase a numerical value to be changed according to an operation on the first operation member and decrease the numerical value to be changed according to an operation on the second operation member, the numerical value to be changed being displayed in a display area on the display unit, the display area remaining unchanged in position before and after a change of the numerical value to be changed.

25. A computer-readable non-transitory storage medium storing a program for causing a computer to perform the method for controlling an electronic apparatus according to claim 24.

26. A method for controlling an electronic apparatus including a display unit arranged on a first surface of the electronic apparatus, a first operation member arranged on a second surface of the electronic apparatus, and a second operation member arranged on a third surface of the electronic apparatus, wherein the third surface is on a right side of the electronic apparatus when the first and second surfaces are viewed as front and top sides, respectively, of the electronic apparatus, the method comprising
performing control to move a plurality of items displayed on the display unit up according to an operation on the first operation member and move the plurality of items down according to an operation on the second operation member.

27. A computer-readable non-transitory storage medium storing a program for causing a computer to perform the method for controlling an electronic apparatus according to claim 26.

* * * * *